US012581194B2

(12) United States Patent (10) Patent No.: US 12,581,194 B2
Zhang et al. (45) Date of Patent: Mar. 17, 2026

(54) METHODS TO ACHIEVE SMOOTH ZOOM FOR VIDEO IN CAMERAS

(71) Applicant: Apple Inc., Cupertino, CA (US)

(72) Inventors: Buyue Zhang, Sunnyvale, CA (US); Walker J. Eagleston, San Francisco, CA (US); Avijit S. Wasu, San Jose, CA (US); Jeffrey A. Brasket, Honolulu, HI (US); Florian Ciurea, Campbell, CA (US); Zejing Wang, Mountain View, CA (US); Sean Z. Amadio, Santa Cruz, CA (US); Julio C. Hernandez Zaragoza, Cupertino, CA (US); Tao Zhang, Campbell, CA (US)

(73) Assignee: Apple Inc., Cupertino, CA (US)

( * ) Notice: Subject to any disclaimer, the term of this patent is extended or adjusted under 35 U.S.C. 154(b) by 343 days.

(21) Appl. No.: 18/173,443

(22) Filed: Feb. 23, 2023

(65) Prior Publication Data

US 2024/0080564 A1 Mar. 7, 2024

Related U.S. Application Data

(60) Provisional application No. 63/374,697, filed on Sep. 6, 2022.

(51) Int. Cl.
*H04N 23/69* (2023.01)
*H04N 23/45* (2023.01)
*H04N 23/68* (2023.01)

(52) U.S. Cl.
CPC ............. *H04N 23/69* (2023.01); *H04N 23/45* (2023.01); *H04N 23/6842* (2023.01)

(58) Field of Classification Search
CPC ..... H04N 23/69; H04N 23/6842; H04N 23/45
USPC ........................................................ 348/240.3
See application file for complete search history.

(56) References Cited

U.S. PATENT DOCUMENTS

2022/0060674 A1* 2/2022 Kim ........................ H04N 23/69

* cited by examiner

*Primary Examiner* — Joel W Fosselman
(74) *Attorney, Agent, or Firm* — Blank Rome LLP

(57) ABSTRACT

Electronic devices, methods, and program storage devices for achieving smooth zooming operations during video capture are disclosed. In particular, smooth zooming may be desirable during video capture operations that involve a single image capture device and/or transitioning between two or more distinct image capture devices, e.g., having different optical and/or zooming properties, during the video capture. When video zooming is done abruptly, it can lead to an unpleasant user experience. The techniques described herein to improve the smoothness of zooming operations include: the use of longer zoom "ramps" for image capture devices; the "early" transitioning between image capture devices during video capture; and the performance of additional "digital zoom smoothing-aware" video image stabilization operations. The embodiments described herein also provide for a more consistent user experience between video streaming (i.e., "preview") modes and the recorded (i.e., "final") zoomed video that is produced using the various zoom smoothing techniques described herein.

25 Claims, 10 Drawing Sheets

200

202 → TOTAL ZOOM FACTOR

204 → FRAME NUMBER

"MORE" SMOOTHED ZOOM (206) ▪ ▪ ▪
"LESS" SMOOTHED ZOOM (208) ———

206

208

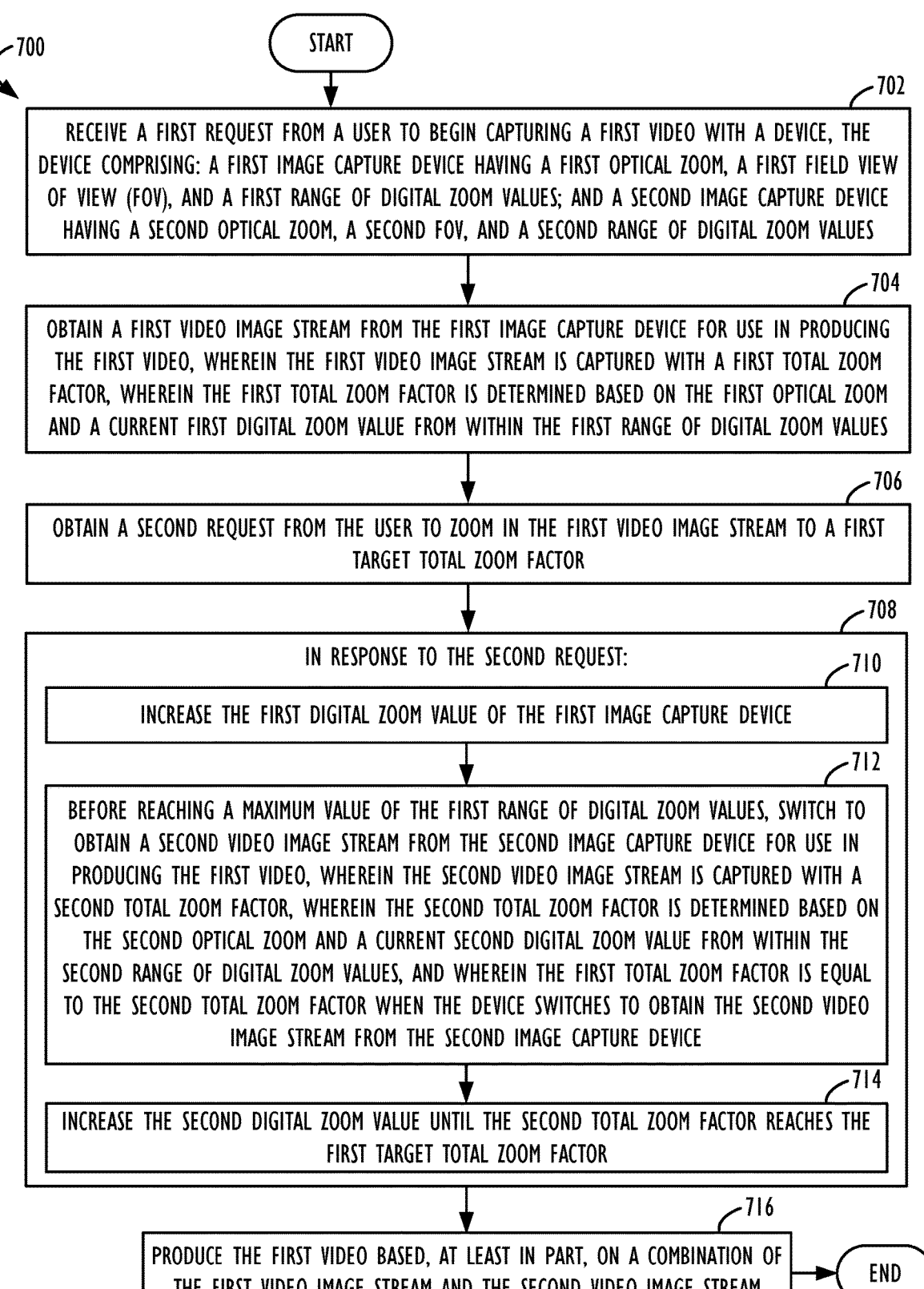

700

START

702

RECEIVE A FIRST REQUEST FROM A USER TO BEGIN CAPTURING A FIRST VIDEO WITH A DEVICE, THE DEVICE COMPRISING: A FIRST IMAGE CAPTURE DEVICE HAVING A FIRST OPTICAL ZOOM, A FIRST FIELD VIEW OF VIEW (FOV), AND A FIRST RANGE OF DIGITAL ZOOM VALUES; AND A SECOND IMAGE CAPTURE DEVICE HAVING A SECOND OPTICAL ZOOM, A SECOND FOV, AND A SECOND RANGE OF DIGITAL ZOOM VALUES

704

OBTAIN A FIRST VIDEO IMAGE STREAM FROM THE FIRST IMAGE CAPTURE DEVICE FOR USE IN PRODUCING THE FIRST VIDEO, WHEREIN THE FIRST VIDEO IMAGE STREAM IS CAPTURED WITH A FIRST TOTAL ZOOM FACTOR, WHEREIN THE FIRST TOTAL ZOOM FACTOR IS DETERMINED BASED ON THE FIRST OPTICAL ZOOM AND A CURRENT FIRST DIGITAL ZOOM VALUE FROM WITHIN THE FIRST RANGE OF DIGITAL ZOOM VALUES

706

OBTAIN A SECOND REQUEST FROM THE USER TO ZOOM IN THE FIRST VIDEO IMAGE STREAM TO A FIRST TARGET TOTAL ZOOM FACTOR

708

IN RESPONSE TO THE SECOND REQUEST:

710

INCREASE THE FIRST DIGITAL ZOOM VALUE OF THE FIRST IMAGE CAPTURE DEVICE

712

BEFORE REACHING A MAXIMUM VALUE OF THE FIRST RANGE OF DIGITAL ZOOM VALUES, SWITCH TO OBTAIN A SECOND VIDEO IMAGE STREAM FROM THE SECOND IMAGE CAPTURE DEVICE FOR USE IN PRODUCING THE FIRST VIDEO, WHEREIN THE SECOND VIDEO IMAGE STREAM IS CAPTURED WITH A SECOND TOTAL ZOOM FACTOR, WHEREIN THE SECOND TOTAL ZOOM FACTOR IS DETERMINED BASED ON THE SECOND OPTICAL ZOOM AND A CURRENT SECOND DIGITAL ZOOM VALUE FROM WITHIN THE SECOND RANGE OF DIGITAL ZOOM VALUES, AND WHEREIN THE FIRST TOTAL ZOOM FACTOR IS EQUAL TO THE SECOND TOTAL ZOOM FACTOR WHEN THE DEVICE SWITCHES TO OBTAIN THE SECOND VIDEO IMAGE STREAM FROM THE SECOND IMAGE CAPTURE DEVICE

714

INCREASE THE SECOND DIGITAL ZOOM VALUE UNTIL THE SECOND TOTAL ZOOM FACTOR REACHES THE FIRST TARGET TOTAL ZOOM FACTOR

716

PRODUCE THE FIRST VIDEO BASED, AT LEAST IN PART, ON A COMBINATION OF THE FIRST VIDEO IMAGE STREAM AND THE SECOND VIDEO IMAGE STREAM

END

FIG. 7A

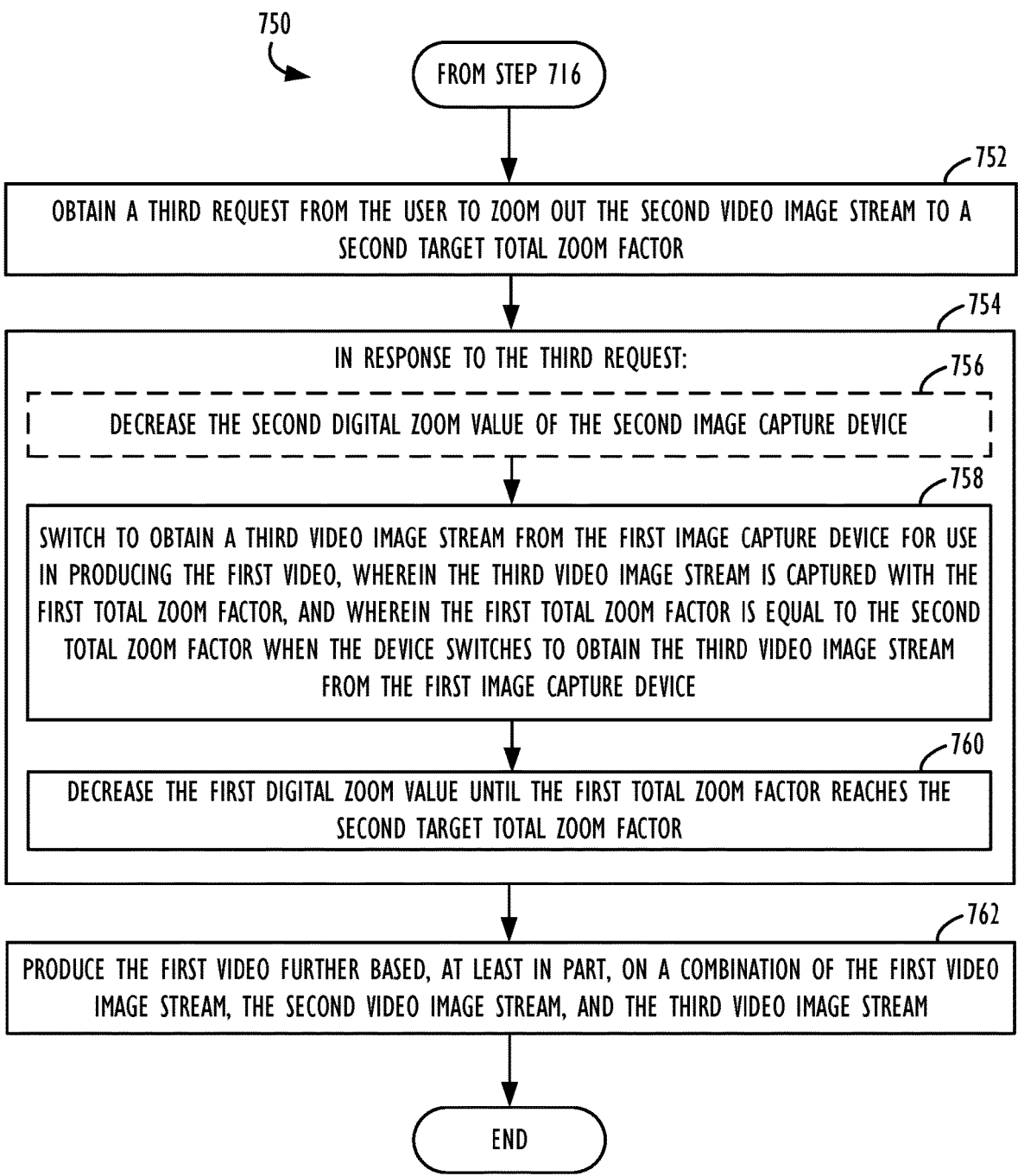

750

FROM STEP 716

752

OBTAIN A THIRD REQUEST FROM THE USER TO ZOOM OUT THE SECOND VIDEO IMAGE STREAM TO A SECOND TARGET TOTAL ZOOM FACTOR

754

IN RESPONSE TO THE THIRD REQUEST:

756

DECREASE THE SECOND DIGITAL ZOOM VALUE OF THE SECOND IMAGE CAPTURE DEVICE

758

SWITCH TO OBTAIN A THIRD VIDEO IMAGE STREAM FROM THE FIRST IMAGE CAPTURE DEVICE FOR USE IN PRODUCING THE FIRST VIDEO, WHEREIN THE THIRD VIDEO IMAGE STREAM IS CAPTURED WITH THE FIRST TOTAL ZOOM FACTOR, AND WHEREIN THE FIRST TOTAL ZOOM FACTOR IS EQUAL TO THE SECOND TOTAL ZOOM FACTOR WHEN THE DEVICE SWITCHES TO OBTAIN THE THIRD VIDEO IMAGE STREAM FROM THE FIRST IMAGE CAPTURE DEVICE

760

DECREASE THE FIRST DIGITAL ZOOM VALUE UNTIL THE FIRST TOTAL ZOOM FACTOR REACHES THE SECOND TARGET TOTAL ZOOM FACTOR

762

PRODUCE THE FIRST VIDEO FURTHER BASED, AT LEAST IN PART, ON A COMBINATION OF THE FIRST VIDEO IMAGE STREAM, THE SECOND VIDEO IMAGE STREAM, AND THE THIRD VIDEO IMAGE STREAM

END

*FIG. 7B*

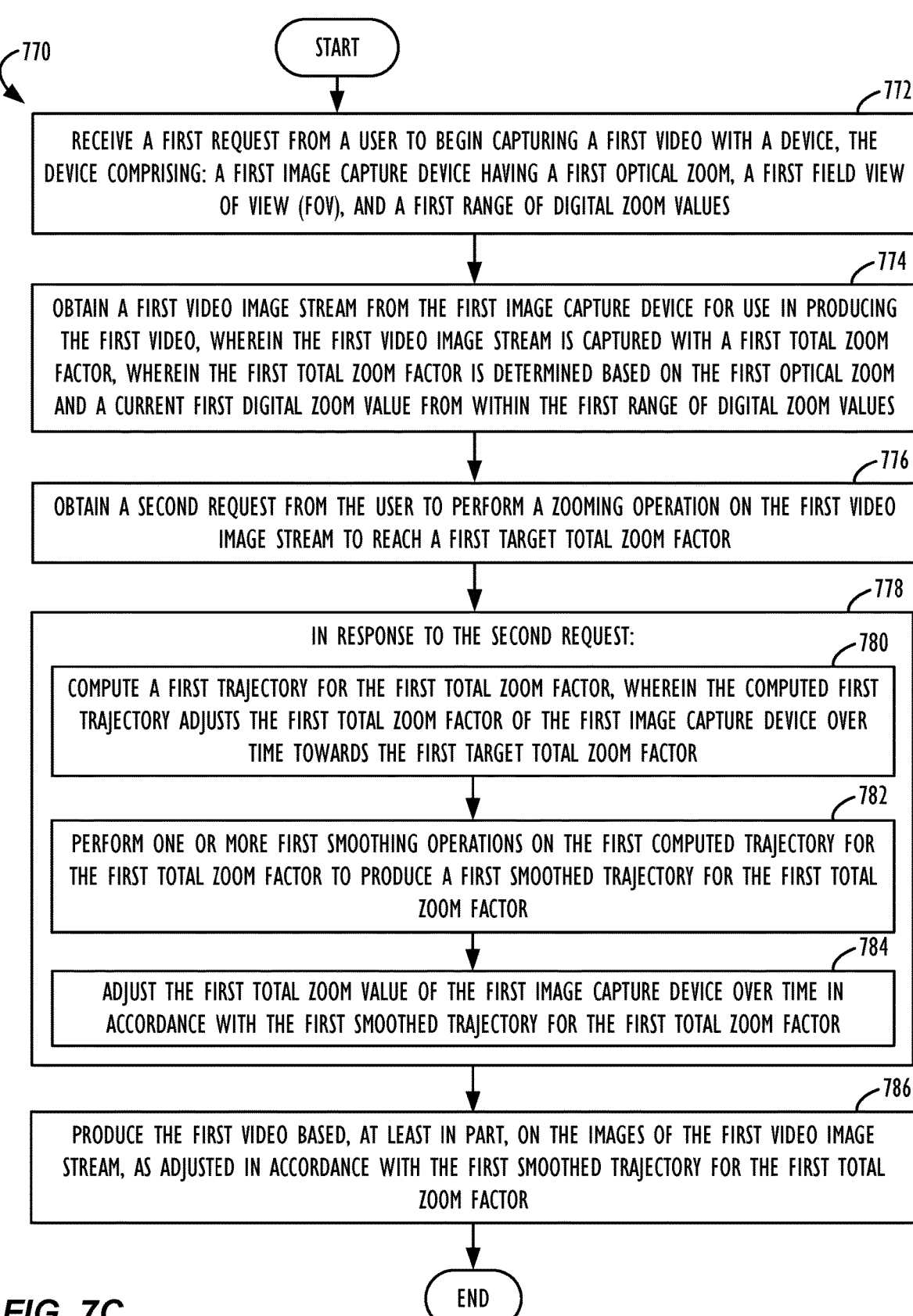

770

START

772

RECEIVE A FIRST REQUEST FROM A USER TO BEGIN CAPTURING A FIRST VIDEO WITH A DEVICE, THE DEVICE COMPRISING: A FIRST IMAGE CAPTURE DEVICE HAVING A FIRST OPTICAL ZOOM, A FIRST FIELD VIEW OF VIEW (FOV), AND A FIRST RANGE OF DIGITAL ZOOM VALUES

774

OBTAIN A FIRST VIDEO IMAGE STREAM FROM THE FIRST IMAGE CAPTURE DEVICE FOR USE IN PRODUCING THE FIRST VIDEO, WHEREIN THE FIRST VIDEO IMAGE STREAM IS CAPTURED WITH A FIRST TOTAL ZOOM FACTOR, WHEREIN THE FIRST TOTAL ZOOM FACTOR IS DETERMINED BASED ON THE FIRST OPTICAL ZOOM AND A CURRENT FIRST DIGITAL ZOOM VALUE FROM WITHIN THE FIRST RANGE OF DIGITAL ZOOM VALUES

776

OBTAIN A SECOND REQUEST FROM THE USER TO PERFORM A ZOOMING OPERATION ON THE FIRST VIDEO IMAGE STREAM TO REACH A FIRST TARGET TOTAL ZOOM FACTOR

778

IN RESPONSE TO THE SECOND REQUEST:

780

COMPUTE A FIRST TRAJECTORY FOR THE FIRST TOTAL ZOOM FACTOR, WHEREIN THE COMPUTED FIRST TRAJECTORY ADJUSTS THE FIRST TOTAL ZOOM FACTOR OF THE FIRST IMAGE CAPTURE DEVICE OVER TIME TOWARDS THE FIRST TARGET TOTAL ZOOM FACTOR

782

PERFORM ONE OR MORE FIRST SMOOTHING OPERATIONS ON THE FIRST COMPUTED TRAJECTORY FOR THE FIRST TOTAL ZOOM FACTOR TO PRODUCE A FIRST SMOOTHED TRAJECTORY FOR THE FIRST TOTAL ZOOM FACTOR

784

ADJUST THE FIRST TOTAL ZOOM VALUE OF THE FIRST IMAGE CAPTURE DEVICE OVER TIME IN ACCORDANCE WITH THE FIRST SMOOTHED TRAJECTORY FOR THE FIRST TOTAL ZOOM FACTOR

786

PRODUCE THE FIRST VIDEO BASED, AT LEAST IN PART, ON THE IMAGES OF THE FIRST VIDEO IMAGE STREAM, AS ADJUSTED IN ACCORDANCE WITH THE FIRST SMOOTHED TRAJECTORY FOR THE FIRST TOTAL ZOOM FACTOR

END

*FIG. 7C*

METHODS TO ACHIEVE SMOOTH ZOOM FOR VIDEO IN CAMERAS

TECHNICAL FIELD

This disclosure relates generally to the field of digital image processing. More particularly, but not by way of limitation, it relates to techniques for achieving smooth zooming operations during video capture and, e.g., video capture operations that involve a single image capture device or video capture operations that involve transitioning between two or more distinct image capture devices (e.g., cameras having different optical and/or digital zooming properties).

BACKGROUND

Video zooming is a commonly used feature in modern electronic image capture devices, such as smartphones, tablets, and other devices with embedded digital cameras. Various types of user interface (UI) elements or controls may be provided to users to control a desired zoom level during video capture operations, e.g., buttons, sliders, dials, gestures, audio and/or text commands, etc. As described herein, the so-called "total zoom factor" that an image capture device (e.g., a camera) is capable of achieving in captured images may be determined by a combination (e.g., a multiplication) of an optical zoom value and a digital zoom value associated with the image capture device.

The term "optical zoom," as used herein, reflects a physical property of the camera's lens and may, e.g., be changed by causing a physical change in a lens, such as by adjusting the distance between the camera's image sensor and the lens; whereas, the term "digital zoom value," as used herein, reflects the use of computational processing of a captured image (e.g., via cropping and/or magnification) to either enlarge (or shrink) a particular area within the FOV of a captured image.

In order to produce "preview" videos (i.e., videos that are streamed from an image capture device to a display of an electronic device as the video images are being captured) and/or "recorded" videos (i.e., videos that may be processed and saved to non-volatile memory after the conclusion of the video image capture operations) with an even greater range of possible total zoom factor values, it may be desirable to switch between multiple, different image capture devices that are embedded in the electronic device, e.g., those capable of capturing images with different ranges of total zoom factors, during the capture of a video image stream.

For example, a first image capture device of an electronic device may be capable of capturing images with a total zoom factor of 1.0×-2.5×, while a second image capture device of an electronic device may be capable of capturing images with a total zoom factor of 2.0×-6.0×, and a third image capture device of an electronic device may be capable of capturing images with a total zoom factor of 5.0×-10.0×. (It is to be understood that this configuration of image capture devices and ranges of total zoom factors is given purely for illustrative purposes.)

However, when a user of an electronic device indicates a desire for an abrupt video zoom operation to occur during video image capture operations, e.g., by inputting a rapid and/or large zoom request via the device's UI (e.g., a "zoom in" request or a "zoom out" request, which may—or may not—cause the electronic device to switch between image capture devices being used to capture the video images), the resulting video image stream that is streamed to a display of the electronic device (and/or recorded into memory of the electronic device) may appear choppy and/or unstable, e.g., with abrupt field of view (FOV) changes, thereby leading to an unpleasant user experience.

Thus, what is needed is an approach to leverage various technological improvements to the control of image capture device hardware—as well as to the software stack responsible for processing of images captured by such image capture devices—to provide a smoother video presentation while a user is zooming in (or out) during video image capture operations, thereby also improving the quality and smoothness of the recorded videos and providing for a better overall user experience.

SUMMARY

Electronic devices, methods, and program storage devices for achieving smooth zooming operations during video capture are disclosed herein. In particular, smooth zooming may be desirable during video capture operations that involve a single image capture device and/or in video capture operations that involve transitioning between capturing video images with two or more distinct image capture devices, e.g., image capture devices having different optical and/or digital zooming properties. When video zooming is done too abruptly, it can lead to an unpleasant user experience.

The techniques described herein to improve the smoothness of zooming operations include: the use of longer zoom ramps for image capture devices; the early transitioning between image capture devices during video captures (e.g., during video capture operations that involve transitioning between image capture devices); and the performance of additional digital zoom smoothing operations, including "digital zoom smoothing-aware" video image stabilization (VIS) operations. The embodiments described herein also provide for a more consistent user experience between video streaming (i.e., "preview") modes and the recorded (i.e., "final") zoomed video that is produced using the various zoom smoothing techniques described herein.

As mentioned above, various electronic device embodiments are disclosed herein. Such electronic devices may include: a display; a user interface; one or more processors; a memory coupled to the one or more processors; and one or more image capture devices, such as a first image capture device having a first optical zoom, a first field view of view (FOV), and a first range of digital zoom values. According to one embodiment, instructions may be stored in the memory, the instructions, when executed, causing the one or more processors to: receive a first request from a user to begin capturing a first video; obtain a first video image stream from the first image capture device for use in producing the first video, wherein the first video image stream is captured with a first total zoom factor, wherein the first total zoom factor is determined based on the first optical zoom and a current first digital zoom value from within the first range of digital zoom values; obtain a second request from the user to perform a zooming operation on the first video image stream (e.g., a "zoom in" operation or a "zoom out" operation) to reach a first target total zoom factor. In response to the second request, the one or more processors may: compute a first trajectory for the first total zoom factor, wherein the computed first trajectory adjusts the first total zoom factor of the first image capture device over time towards the first target total zoom factor; perform one or more first smoothing operations on the first computed trajectory for the first total zoom factor to produce a first smoothed trajectory for the first total zoom factor; and adjust the first total zoom value of the first image capture device over time in accordance with the first smoothed trajectory for the first total zoom factor. Finally, the one or more processors may produce the first video based, at least in part, on the images of the first video image stream, as adjusted in accordance with the first smoothed trajectory for the first total zoom factor.

According to another embodiment, an electronic device may further comprise at least a second image capture device having a second optical zoom, a second FOV, and a second range of digital zoom values, wherein the electronic device may transition to capturing images with the second image capture device at some point during the video image capture operations. For example, instructions may be stored in the memory, the instructions, when executed, causing the one or more processors to: receive a first request from a user to begin capturing a first video; obtain a first video image stream from the first image capture device for use in producing the first video, wherein the first video image stream is captured with a first total zoom factor, wherein the first total zoom factor is determined based on the first optical zoom and a current first digital zoom value from within the first range of digital zoom values; and then obtain a second request from the user to "zoom in" the first video image stream to a first target total zoom factor.

In response to the second request, the one or more processors may then be configured to: increase the first digital zoom value of the first image capture device; and, before reaching a maximum value of the first range of digital zoom values, switch to obtain a second video image stream from the second image capture device for use in producing the first video, wherein the second video image stream is captured with a second total zoom factor, wherein the second total zoom factor is determined based on the second optical zoom and a current second digital zoom value from within the second range of digital zoom values, and wherein the first total zoom factor is equal to the second total zoom factor when the one or more processors switch to obtain the second video image stream from the second image capture device. The second digital zoom value may then be increased until the second total zoom factor reaches the first target total zoom factor. Finally, the first video may be produced based, at least in part, on a combination of the first video image stream and the second video image stream.

In some such embodiments, the second FOV is narrower than the first FOV, and the second optical zoom is greater than the first optical zoom. In other embodiments, the first image capture device and the second image capture device are capable of producing partially-overlapping ranges of total zoom factors for captured video image streams. In still other embodiments, the first target total zoom factor is outside a range of total zoom factors obtainable by the first image capture device.

According to other embodiments, the instructions, when executed, may further cause the one or more processors to perform a smoothed "zoom out" operation, comprising: obtaining a third request from the user to zoom out the second video image stream to a second target total zoom factor; and then, in response to the third request: optionally decreasing the second digital zoom value of the second image capture device (e.g., if it is not desired or not possible to immediately switch back to capturing the video images with the first image capture device); and, switching to obtaining a third video image stream from the first image capture device for use in producing the first video, wherein the third video image stream is captured with the first total zoom factor, and wherein the first total zoom factor is equal to the second total zoom factor when the one or more processors switch to obtain the third video image stream from the first image capture device; and, finally, decreasing the first digital zoom value until the first total zoom factor reaches the second target total zoom factor. In such embodiments, the produced first video may further combine the video images from the third video image stream with the video images from the aforementioned first video image stream and the second video image stream.

In some embodiments, a rate at which the digital zoom value of a respective image capture device is either increased (or decreased) over time may be smoothed, e.g., by performing one or more smoothing operations (e.g., Gaussian smoothing operations, soft-clipping operations, kernel dilation, etc.) on a computed trajectory for the total zoom factor of the respective image capture device, thereby producing a "smoothed trajectory" for the total zoom factor and then increasing (or decreasing) the digital zoom value of the respective image capture device over time in accordance with the smoothed trajectory for the total zoom factor when producing the recorded version of the first video.

In still other embodiments, a rate at which the digital (or total) zoom value of a respective image capture device is increased or decreased is determined based, at least in part, on an overscan allocation parameter, wherein the overscan allocation parameter allocates a first portion of an overscan region of the respective image capture device's FOV to adjusting the digital (or total) zoom value of the respective image capture device, and allocates a second portion of the overscan region to video image stabilization (VIS) operations. In some such embodiments, a value of the overscan allocation parameter may be determined based, at least in part, on one or more of the following: a predetermined overscan allocation value; positional information obtained from one or more positional sensors of the electronic device during the capture of the video image stream; or metadata obtained from images captured in the video image stream. In yet other such embodiments, strength values for the VIS operations may be determined based, at least in part, on the rate at which (and/or degree to which) the digital zoom value of the respective image capture device is decreased (e.g., if a large portion of the overscan is allocated to smoothing the digital zoom in or zoom out operation, then there may not be much overscan remaining for VIS operations, meaning that the stabilization strength may be lowered correspondingly for those captured image frames wherein the zoom smoothing operations are dominating the usage of the overscan).

Various methods of performing improved zoom smoothing operations are also disclosed herein, in accordance with the various electronic device embodiments enumerated above. Non-transitory program storage devices are also disclosed herein, which non-transitory program storage devices may store instructions for causing one or more processors to perform operations in accordance with the various electronic device and method embodiments enumerated above.

BRIEF DESCRIPTION OF THE DRAWINGS

FIGS. 7A-7C are flow charts illustrating methods of performing smooth zooming operations in single-image capture device and multi-image capture device electronic devices, according to one or more embodiments.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes, and it may not have been selected to delineate or circumscribe the inventive subject matter, and, thus, resort to the claims may be necessary to determine such inventive subject matter. Reference in the specification to "one embodiment" or to "an embodiment" means that a particular feature, structure, or characteristic described in connection with the embodiments is included in at least one embodiment of one of the inventions, and multiple references to "one embodiment" or "an embodiment" should not be understood as necessarily all referring to the same embodiment.

Exemplary Smooth Zooming Framework

Figure 1:
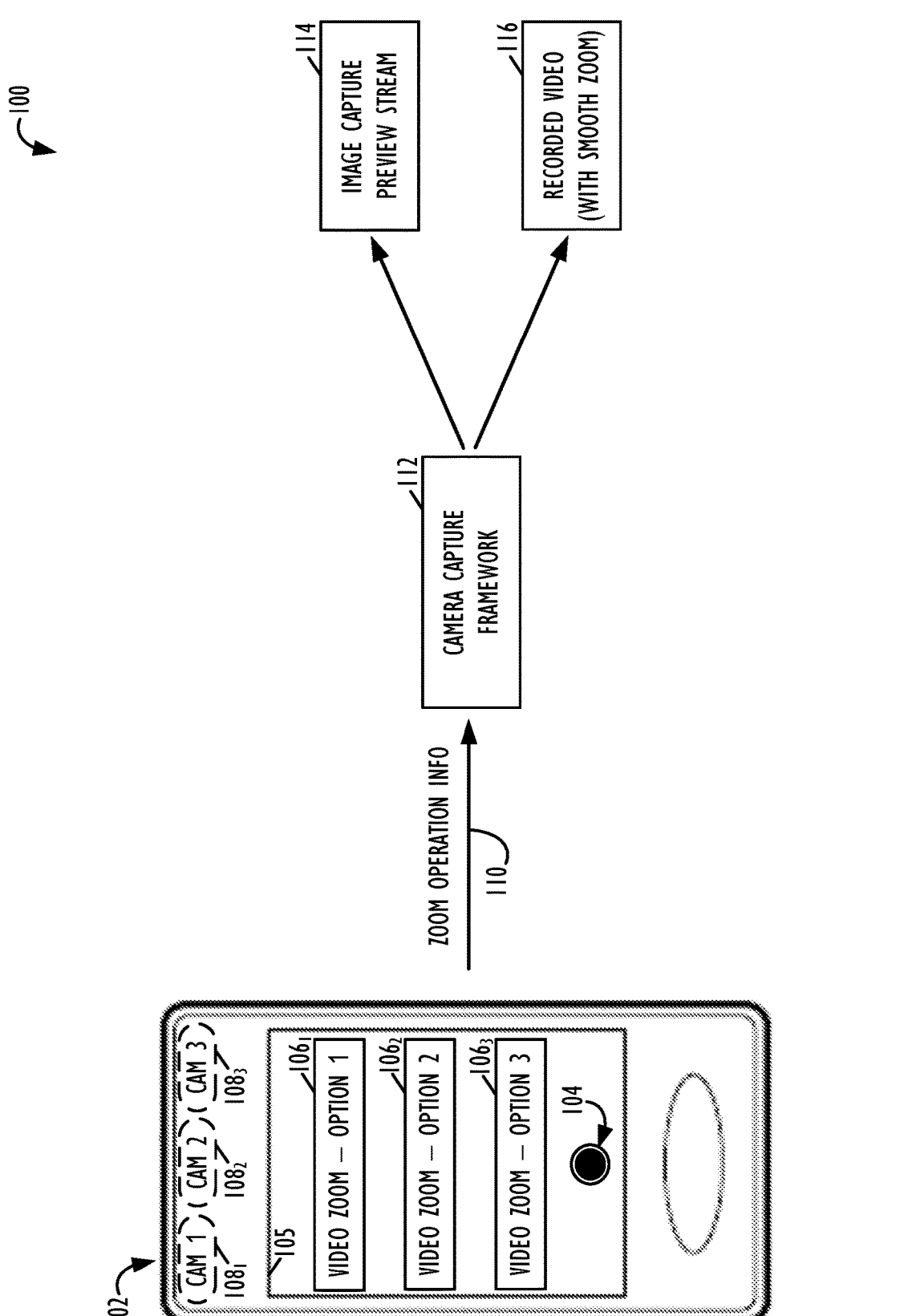
FIG. 1 illustrates an exemplary smooth zooming operation framework, according to one or more embodiments.

Referring now to FIG. 1, an exemplary smooth zooming operation framework 100 is illustrated, according to one or more embodiments. Smartphone 102 represents an exemplary electronic device with one or more embedded image capture devices 108. For example, image capture device "CAM 1" ($108_1$) may represent a camera with an "ultra-wide" FOV that is capable of producing images with total zoom factors in the range of, e.g., 1.0×-2.5×, while image capture device "CAM 2" ($108_2$) may represent a camera with an "wide" FOV that is capable of producing images with total zoom factors in the range of, e.g., 2.0×-6.0×, and image capture device "CAM 3" ($108_3$) may represent a camera with an "telephoto" FOV that is capable of producing images with total zoom factors in the range of, e.g., 5.0×-10.0×. (It is to be understood that this configuration of image capture devices and ranges of total zoom factors is given purely for illustrative purposes. Some electronic devices may have only a single embedded image capture devices, others may have and use multiple image capture devices during video capture operations, still others may have multiple image capture devices but only use a single one during a given video capture operation, etc.)

Exemplary electronic device smartphone 102 may further comprise one or more display screens 105, and one or more UI elements (e.g., button 104). Button 104 may, e.g., be a physical or software-based button used by a user to indicate when to begin and end capturing a video image stream with device 102. According to some embodiments, as video images are captured, they may be live streamed to a display screen (e.g., display screen 105) so that the user has near-instantaneous feedback of what the captured scene that is being recorded to memory in the form of a produced video will include (e.g., in terms of FOV, scene content, focus, exposure, zoom, and other image properties). The use of a live image stream preview also allows a user to make adjustments to the video in real time, e.g., by performing zoom in or zoom out operations, to ensure the desired scene content is being captured.

Images from an incoming video image stream may include various metadata information (e.g., timestamps, positional information associated with the image capture device, focus levels, exposure levels, zoom settings, and other image properties). The incoming video image stream may be captured for seconds, minutes, hours, days, etc., based on the capabilities and/or needs of a given implementation. According to some embodiments, video image frames in the incoming image stream may, by default, be captured according to a frame rate, e.g., 15 frames per second (fps), 30 fps, 60 fps, etc., and with a default FOV or total zoom factor, each of which is subject to change during the course of a captured video.

In some embodiments, the total zoom factor of the captured video image stream may remain constant and uninterrupted, unless (or until) a request is received at the image capture device to zoom in (or zoom out) the captured video image stream to a different target total zoom factor. In some such embodiments, there may be various possible UI video zoom options 106 that are configured to allow a user to indicate a desired level of target total zoom factor to achieve in the incoming video image stream. For example, a first video zoom option ($106_1$) may comprise a button zoom that instructs the electronic device to transition directly from the current total zoom factor to a different target total zoom factor, e.g., according to predetermined zoom "ramps" and image capture device transitioning schemes, as will be discussed in further detail below. As another example, a second video zoom option ($106_2$) may comprise a slider or dial-based zoom that allows a user to instruct the electronic device with greater precision what level of target total zoom factor to move towards (as well as how quickly the electronic device should move the total zoom factor towards said target total zoom factor). As another example, a third video zoom option ($106_3$) may comprise one or more UI gestures (e.g., touchscreen gestures input at display screen 105) that also allow a user to instruct the electronic device as to what level of target total zoom factor is desired (as well as how quickly the electronic device should move the total zoom factor towards said target total zoom factor). As will be described herein, a given zoom operation request may or may not cause an electronic device to transition between using different image capture devices to performed video image capture operations.

Returning to FIG. 1, the zoom operation information (110) embodying the user's interaction(s) with the UI video zoom options 106 may be passed to a camera capture framework 112. As discussed above, based on the amount (and rate) of zooming requested by the user, the camera capture framework 112 may make determinations how to implement the requested zooming via modifications to the image capture device hardware and/or software stack. For example, the camera capture framework 112 may determine: when (or if) to transition between various image capture devices during the zooming operation; how long of a "ramp" to use when zooming in or zooming out a given image capture device; how to allot any available overscan in a given image capture device's FOV between smooth zooming operations and other operations (such as VIS operations or camera transition operations); and/or how to control various other camera systems (e.g., auto focus, auto exposure, tone mapping, white balance, etc.) in preparation for image capture device transitions, so as to limit any abrupt or jarring changes in the recorded video image stream.

As mentioned above, in some embodiments, camera capture framework 112 may be capable of producing an image capture preview stream 114, e.g., which is sent directly to display screen 105 for display, and which may aid a user in making adjustments to the video in real time, such as by performing additional zoom in or zoom out operations to ensure the desired scene content is being captured. Camera capture framework 112 may be capable of producing a first recorded video with smooth zooming 116.

As will be explained herein, while some of the adjustments implemented by camera capture framework 112 will improve the smoothness of the video during zooming operations as seen in the image capture preview stream 114 (e.g., when to transition between various image capture devices during the zooming operation, how long of ramps to use when zooming in or zooming out a given image capture device), other improvements implemented by camera capture framework 112 will only manifest in the recorded video 116 (e.g., those smoothing techniques that may rely on "looking ahead" to the amount of digital zoom needed in "future" frames in order to determine a more smoothed trajectory for an image capture device's total zoom factor and/or to more smoothly adjust an image capture device's VIS strength parameter value over time based on how much of the overscan is being allotted to digital zoom operations at a given time).

Figure 2:
FIG. 2 is a graph illustrating exemplary smooth zooming operations, according to one or more embodiments.

Referring now to FIG. 2, a graph 200 is shown, illustrating exemplary smooth zooming operations, according to one or more embodiments. The vertical axis 202 of graph 200 represents the current total zoom factor of an exemplary image capture device, and the horizontal axis 204 of graph 200 represents the frame number of exemplary video image frames captured over time, moving from left to right across the horizontal axis. As illustrated in graph 200, an example of a comparatively less smoothed total zoom factor trajectory for the exemplary image capture device is shown by solid line 208, while an example of a comparatively more smoothed total zoom factor trajectory for the exemplary image capture device is shown by dashed line 206.

As illustrated, the more smoothed total zoom factor trajectory 206 has a longer "ramp," taking approximately 30 frames (e.g., from frame #30 to frame #60) to get from an initial 1.0× total zoom factor to a desired 5.7× total zoom factor, while the less smoothed total zoom factor trajectory 208 has a shorter and more abrupt ramp, taking only approximately 5 frames (e.g., from frame #30 to frame #35) to get from the initial 1.0× total zoom factor to the desired 5.7× total zoom factor. As may now be appreciated, a camera framework implementing the more smoothed total zoom factor trajectory 206 may produce a final video with a less abrupt or jarring transition from the initial 1.0× total zoom factor to the desired 5.7× total zoom factor (subject, of course, to any further smoothing or image stabilization that may be applied by a given image signal processing pipeline). The lengths of a given zoom ramp may be tuned to the preferences of a particular implementation and/or based, at least in part, on the properties of the particular image capture devices involved, the amount of movement/shake in the electronic device during the ramping period, whether it is a zoom in or a zoom out operation, etc.

Figure 3:
FIG. 3 shows various graphs illustrating exemplary image capture device transitions during smooth zoom operations, according to one or more embodiments.

Referring now to FIG. 3, graphs 300/350 are shown, illustrating exemplary image capture device transitions during smooth zoom operations, according to one or more embodiments. The vertical axis 302 of graphs 300/350 represents the current total zoom factor of an exemplary image capture device, and the horizontal axis 304 of graphs 300/350 represents the frame number of exemplary video image frames captured over time, moving from left to right across the horizontal axis.

As illustrated in graph 300, an exemplary total zoom factor trajectory over 600 captured video image frames is shown for an electronic device having three distinct image capture devices: a first camera (312), represented by the solid line; a second camera (310), represented by the dashed line; and a third camera (314), represented by the dotted line. The total zoom factor trajectory shown in graph 300 begins by utilizing first camera 312 with a total zoom factor of approximately 2.0×, then switches to use second camera 310 to zoom out to a total zoom factor of approximately 1.0×.

Next, the user indicates a desire to zoom all the way into a total zoom factor of approximately 5.7×. In order to reach this total zoom factor value, the electronic device may ramp up the total zoom factor using second camera 310, e.g., to a total zoom factor of approximately 2.5×, then switch to using first camera 312, e.g., up to a total zoom factor of approximately 5.7×, and then finally, at transition point 306 (which, in this example may be the largest total zoom factor that first camera 312 is capable of producing), switch to using third camera 314, which may, e.g., have a native "optical zoom" level that is closer to the requested 5.7× total zoom factor received at the camera capture framework.

From that point on, a similar cycle of camera transitions, e.g., from third camera 314 to first camera 312 to second camera 310 (i.e., for zoom out operations) or from second camera 310 to first camera 312 to third camera 314 (i.e., for zoom in operations) may be followed, depending on the zoom operation information input by a user and received at the camera capture framework.

As may now be appreciated, graph 300 illustrates an example of "late switching" zoom in scheme for transitioning between image capture devices, i.e., the electronic device does not transition between image capture devices unless or until a current image capture device reaches the top of the range of total zoom factors that it is capable of achieving. While a late switching zoom scheme during a zoom in operation may somewhat simplify the implementation of a longer zoom ramp, it can lead to more jarring transitions at the moment the camera is switched.

Turning to graph 350, an example of an improved, so-called "early switching" zoom in scheme for transitioning between image capture devices is illustrated, wherein the electronic device transitions (or switches) between image capture devices preemptively, i.e., transitioning before a given current image capture device reaches the top its range of producible total zoom factors. In some embodiments, an "early switching" zoom in scheme may achieve this by using additional digital zooming to match FOVs between image capture devices at the moment of transitioning. For example, by comparison to graph 300, transition point 308 in graph 350 comes at an earlier frame and at a total zoom factor value (e.g., 5.0×) that does not represent the largest total zoom factor that first camera 312 is capable of producing (e.g., 5.7×). Similarly, other image capture device transitions may happen preemptively according to an early switching zoom in scheme. Some of the benefits of such an early switching zoom in scheme may include: making the transitions between image capture devices less noticeable than if they "snapped" into place at the end of a zoom ramp and helping to improve the consistency in the look and feel of images in the produced video across the transitions between different image capture devices.

Video Stabilization Architecture Incorporating Smooth Zooming Operations

Figure 4:
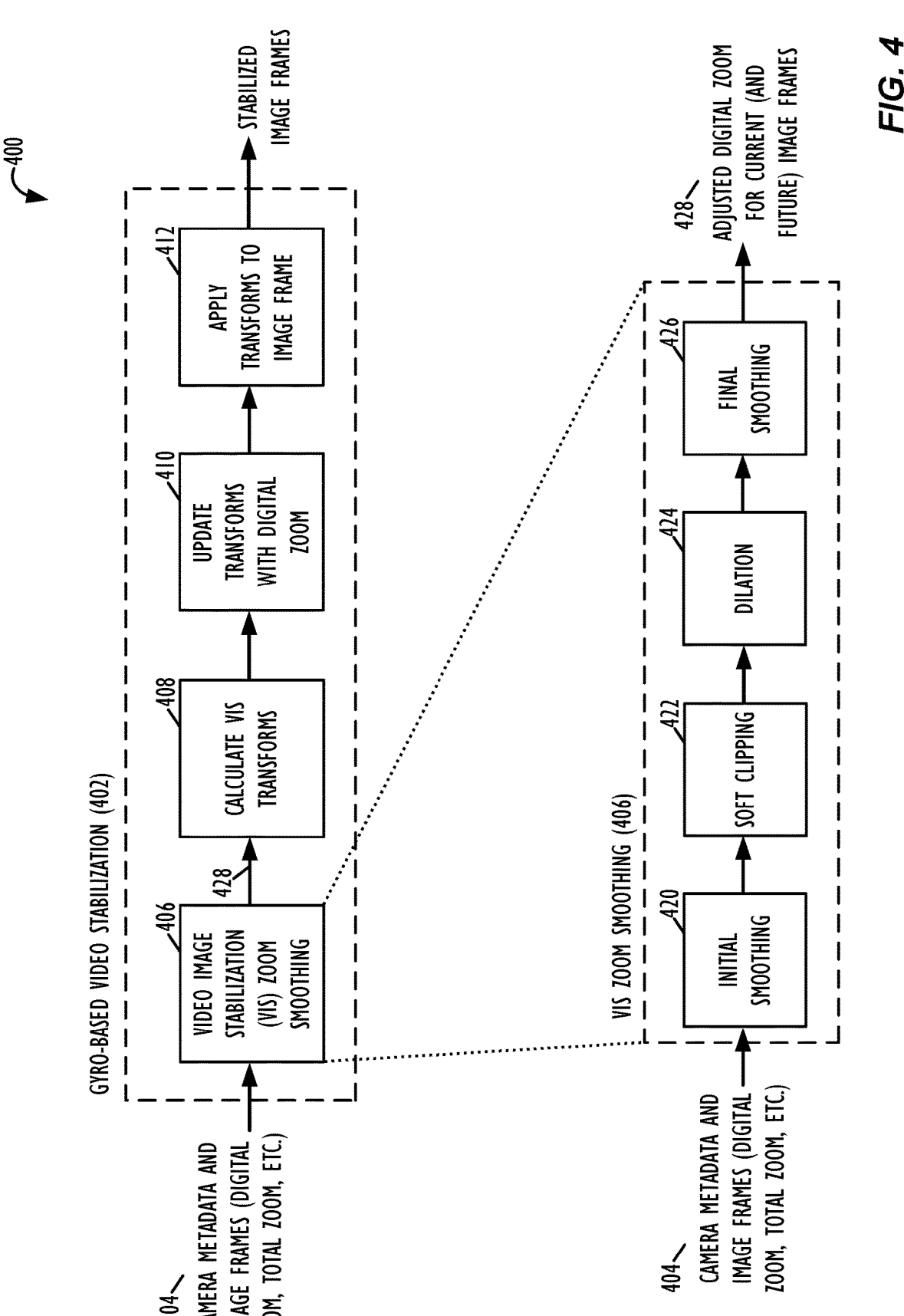
FIG. 4 is an example of a video stabilization architecture that incorporates smooth zooming operations, according to one or more embodiments.

Referring now to FIG. 4, an example of a video stabilization architecture 400 that incorporates smooth zooming operations is illustrated, according to one or more embodiments. In the example of video stabilization architecture 400, a gyro-based video stabilization workflow 402 may be performed by the electronic device that takes, as its inputs, the captured video image frames and various related camera metadata, such as digital zoom values, total zoom values, etc. (404) and produces, as its outputs, motion-stabilized versions of captured video image frames. A typical a gyro-based video stabilization workflow may comprise one or more modules to: calculate the necessary VIS transforms (block 408); update the calculated VIS transforms to account for digital zoom information (block 410), and then apply the calculated and updated transforms to each of the captured video image frames (block 412). In such typical gyro-based video stabilization workflows, the amount of VIS applied to each image may largely be a function of the positional information associated with the image capture device during the capture of such image frames (e.g., as measured by a gyro, accelerometer, inertial measurement unit (IMU), or the like).

In the improved gyro-based video stabilization workflow 402 illustrated in FIG. 4, there is also a zoom smoothing module 406 that is integrated with the gyro-based video stabilization workflow 402. The zoom smoothing module 406 may also take as input the captured video image frames and various related camera metadata 404, e.g., including digital zoom and total zoom factor values associated with the image frames. In some embodiments, a goal of the zoom smoothing module 406 will be to determine a smoothed trajectory for a given image capture device(s)'s total zoom factor, such that, in the recorded video that is produced, the zoom transitions appear less abrupt.

The zoom smoothing operation may involve determining an amount of digital zoom to apply to the video image frames capture by a given image capture device during the video capture. In some cases, as will be explained below, the amount of overscan area available for a given image capture device (i.e., the portion of pixels that are captured by the image capture device around the periphery of its FOV but not typically shown or displayed to viewers of the captured images), may be allocated according to an overscan allocation parameter, wherein the overscan allocation parameter allocates a first portion of the overscan region to the aforementioned digital zoom smoothing operations and a second portion of the overscan region to VIS operations (and/or other operations, such as camera transitions). In other words, the more that the overscan is utilized to smooth the zooming operation (e.g., during a zoom out operation), the less overscan there may be available specifically for VIS operations later in the video stabilization workflow, meaning that the VIS strength parameter may need to be decreased, so that the VIS operations do not exceed the remaining available overscan for a given captured video image frame.

Figure 5:
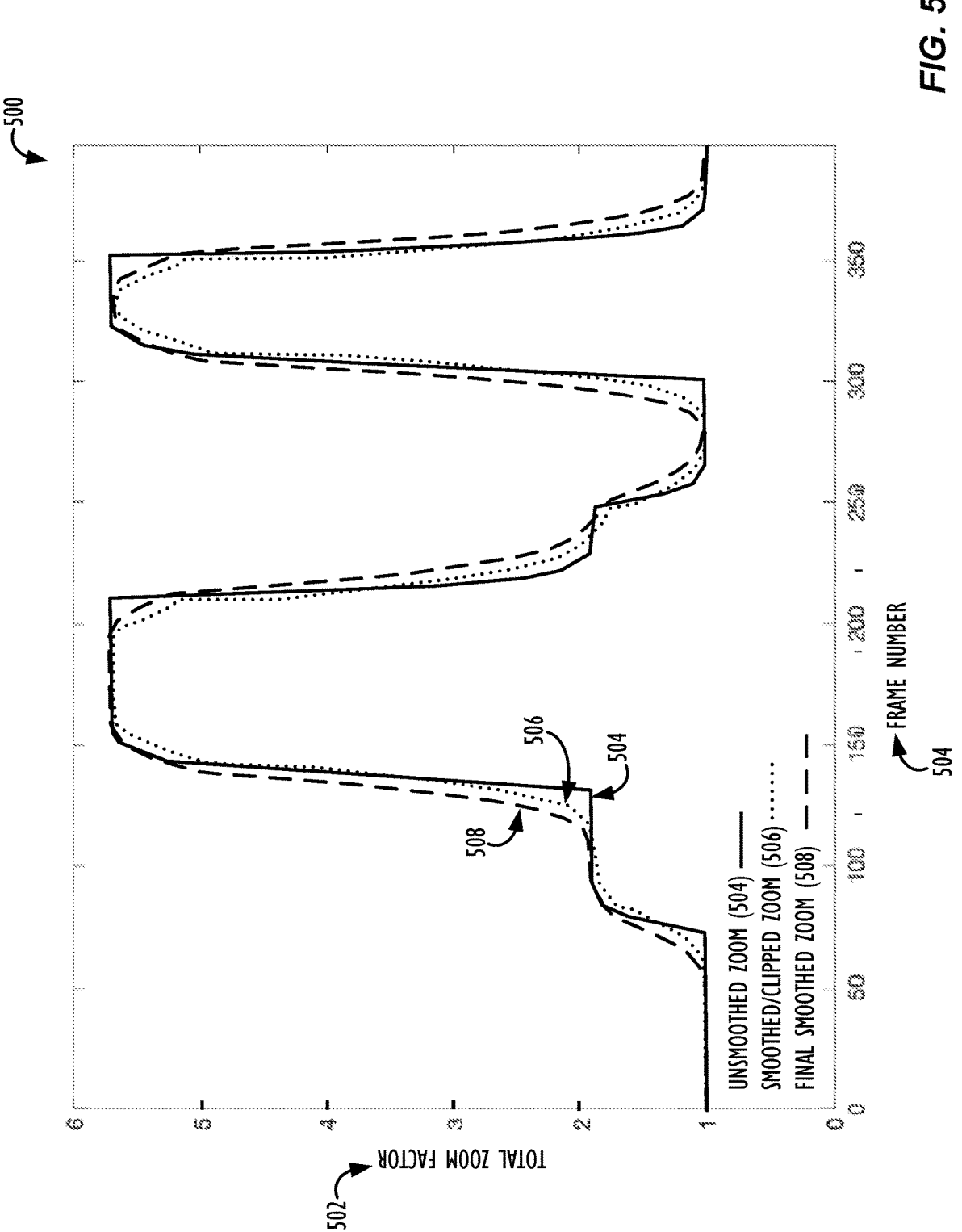
FIG. 5 is a graph illustrating various exemplary smoothed and unsmoothed total zoom factor trajectories, according to one or more embodiments.

In some embodiments, the zoom smoothing module 406 may begin by performing an initial smoothing operation (420) on the trajectory of the total zoom factor, i.e., the total amount of zoom (inclusive of digital zoom) that was applied by the electronic device during the capture of the video image stream. (Trajectory 504, as will be discussed later with reference to FIG. 5, is one example of an initial, i.e., unsmoothed, total zoom factor trajectory for a given captured video image stream.) In some embodiments, the initial smoothing operation 420 may comprise a Gaussian smoothing filter or other finite impulse response (FIR) filters or infinite impulse response (IIR) filters that are applied to the total zoom factor trajectory. For example, a Gaussian smoothing operation, $G(x)$, may take the following form:

$$G(x) = \frac{1}{\sqrt{2\pi} \cdot \sigma_1} \cdot e^{\frac{-x^2}{2\sigma_1^2}},$$

wherein a is the strength of the first Gaussian smoothing filter. In some implementations, $\sigma_1$ can be an empirically determined value (e.g., a tuning parameter), while, in other implementations, it may be dynamically calculated, e.g., based on camera input. As one example, during image capture, the value of $\sigma_1$ may be increased for certain types of user-initiated zoom operations (e.g., pinch-to-zoom operations), while it may be decreased for other types of user-initiated zoom operations (e.g., use of zoom buttons). The ramping up and down of the value of $\sigma_1$ may also be subject to various temporal constraints, e.g., to maintain temporal stability during zooming operations.

In some implementations, it may also be desirable to further smooth or adjust the digital zoom component of the total zoom factor that is applied to the captured images over the duration of the captured video, e.g., if the digital zoom has sharp changes in direction, discontinuities at image capture device transitions, or ever drops below a predetermined minimum threshold value, then smoothing out the trajectory of these changes in the digital zoom factor may also help to achieve a smoother overall total zoom factor. (It is noted that, if desired, the aforementioned Gaussian filtering and all subsequent filtering steps may optionally be performed in the Log domain, i.e., the zoom trajectory signal may be converted to the Log domain before performing the filtering operations.)

In some embodiments, the zoom smoothing module 406 may continue by performing a soft clipping operation (422) on the initially smoothed trajectory of the total zoom factor produced at 420. In some such embodiments, the soft clipping operation 422 may involve clamping the digital zoom factor at a predetermined minimum value, e.g., 1.0×. In still other embodiments, a so-called "clamp value" for the digital zoom factor may be calculated dynamically for each captured video image frame.

For example, according to some implementations, a dynamic digital zoom factor clamp value, c, may be determined as a minimum of two values: $c_1$, and $c_2$, wherein:

$$c_1 = t^a \cdot s^{(1-a)} \text{ and } c_2 = m \cdot s, \text{ and wherein:}$$

s is a minimum supported digital zoom factor, t is a requested digital zoom factor after initial clamping, a is an allowed overscan fraction value (e.g., a may be a tunable parameter with a default between 0 and 1, such as 0.5), and m is a minimum supported zoom factor multiplier (e.g., m may be another tunable parameter with some default value, based on the needs of a given implementation).

Once a digital zoom factor clamp value has been determined, soft clipping operation 422 may be performed to comply with the digital zoom factor clamp value. For example, the soft clipping operation may comprise evaluating a function, f(x), that takes as input a requested digital zoom value (d$_r$) and returns as output a "soft clipped" version of the requested digital zoom value, i.e., to ensure that the digital zoom value returned decreases gradually and does not drop below the determined digital zoom factor clamp value, c—even if a lower digital zoom value has been requested by the camera capture framework.

In one implementation, the soft clipping function, f(x), may be defined as:

$$f(x) = \left(\frac{x}{y_{max}}\right)^p \cdot r + y_{min},$$

for x<d$_r$, and f(x)=x, for x≤d$_r$, wherein x is input digital zoom value before soft clipping, f(x) is output digital zoom value after the soft clipping, d$_r$ is the requested digital zoom factor, $y_{max}$ and $y_{min}$ are the maxima and minima of the output digital zoom value (wherein $y_{max}$ in this equation also corresponds to the requested digital zoom value, d$_r$, and $y_{min}$ in this equation also corresponds to the digital zoom factor clamp value, c, discussed above), r=$y_{max}$−$y_{min}$, and p=($y_{max}$/r). As may now be appreciated, the soft clipping function f(x), above, has the effect of mapping the input value of x from an input range [0, d$_r$] to an output range of [c, d$_r$].

In some embodiments, the zoom smoothing module 406 may continue by performing a dilation operation (424) on the initially smoothed trajectory and soft-clipped trajectory of the total zoom factor produced at 422. In some implementations, the dilation kernel may comprise a simple 1-dimensional (1D) dilation kernel of a tunable size, k, which is configured to set the value of the computed trajectory for the total zoom factor to the maximum value of the trajectory over a moving window of size, k. In some cases, the dilation operation 424 may be necessary, so that any desired final smoothing operations (426) may be performed without the value of the computed smoothed trajectory of the total zoom factor violating any predetermined constraints, such as constraining the final value of the computed smoothed trajectory of the total zoom factor at each point along the trajectory curve to be at least equal to or greater than the corresponding total zoom factor clamping value determined at 422 after the soft clipping operation.

In some implementations, if desired, the final smoothing operations (426) may comprise a second Gaussian smoothing operation, G_2(x), which may take the following form:

$$G\_2(x) = \frac{1}{\sqrt{2\pi} \cdot \sigma_2} \cdot e^{\frac{-x^2}{2\sigma_2^2}},$$

wherein $\sigma_2$ is the strength of the second Gaussian smoothing operation, which is set to a value that is no larger than (k/6), where, as mentioned above, k is the size of the dilation kernel from operation 424. This choice ensures that the size of smoothing kernel is no larger than the size of the dilation kernel, thereby ensuring that the final value of the computed smoothed trajectory of the total zoom factor at each point along the trajectory curve will be at least equal to or greater than the filtered and soft-clipped total zoom factor after 420 and 422, as described above.

Once the final smoothed zoom trajectory has been computed at operation 426, the output 428 of the zoom smoothing module 406 may comprise the adjusted (i.e., smoothed) total zoom values that have now been determined for each of the image frames in the captured video. The output 428 values may then be returned to the aforementioned VIS transform block 408, which would then be aware of the amount of digital zooming that will be applied to current and future frames (and thus be able to determine a remaining portion of the overscan region that may still be allocated to the VIS operations). It is to be understood that the various operations described above with reference to zoom smoothing module 406 (e.g., particular techniques of performing soft clipping operations, 1D kernel dilation, etc.) are given purely for illustrative purposes and comprise but one embodiment of dealing with a set of overscan constraints that may exist in a given implementation. Moreover, combining zoom smoothing operations 406 as part of a VIS module (such as is shown in FIG. 4, with reference to gyro-based video stabilization workflow 402) is purely optional, and the various zoom smoothing operations described herein may be performed independently of whether an electronic device is performing any other image stabilization operations (e.g., VIS, OIS, etc.) as part of its image signal processing pipeline.

Exemplary Smoothed Total Zoom Factor Trajectories

Referring now to FIG. 5, a graph 500 illustrating various exemplary smoothed and unsmoothed total zoom factor trajectories (e.g., as described above with reference to FIG. 4) is shown, according to one or more embodiments. The vertical axis 502 of graph 500 represents the current total zoom factor of an exemplary image capture device, and the horizontal axis 504 of graph 500 represents the frame number of exemplary video image frames captured over time, moving from left to right across the horizontal axis. As illustrated in graph 500, an unsmoothed total zoom factor trajectory for the exemplary image capture device is shown by solid line 504, while a corresponding exemplary smoothed and clipped total zoom factor trajectory for the exemplary image capture device is shown by dashed line 506, and a final smoothed version of the total zoom factor trajectory for the exemplary image capture device is shown by dotted line 508.

As described above, the unsmoothed total zoom factor trajectory 504 represents a visualization of the total zoom factor information that may be input to zoom smoothing module 406 (e.g., in the form of zoom metadata information, including total zoom and digital zoom, that is associated with each of the incoming captured image frames). The smoothed and clipped total zoom factor trajectory 506 may then represent a visualization of the total zoom factor information that may be smoothed and/or soft clipped at blocks 420 and 422, respectively. As illustrated in FIG. 5, smoothed and clipped zoom trajectory 506 may exhibit longer ramps and less sharp or abrupt changes in value than unsmoothed zoom trajectory 504. The final smoothed version of the total zoom factor trajectory 508 may thus represent the smoothed and clipped total zoom factor trajectory after any final dilation and/or secondary Gaussian smoothing operations are applied (and any constraints on the total zoom factor are enforced). As may be appreciated, total zoom factor trajectory 508 now represents the amount of total zoom that will be applied to each frame in the recording of the zoom-smoothed version of the original captured video sequence (subject to any additional digital zooming that may be determined and performed by any subsequent VIS operations to provide stability to the captured video images).

It is to be understood that the smoothing operations described herein may be performed on a total zoom factor trajectory spanning the entire captured video image sequence (i.e., across all of the captured image frames of a given captured video, without regard for when—or if— transitions between the various image capture devices took place), or the smoothing operations may be thought of as being applied individually to the total zoom factor trajectories associated with each of the individual image capture devices during the times when they are "active" (i.e., currently being used to capture the images that will be used in the final video) and being used to zoom out (or zoom in). The individual smoothed trajectories may then conceptually be aggregated together over the length of the captured video image stream to form the overall total zoom factor trajectory for the entire captured video image sequence, as discussed above. In certain implementations, it may be possible or desirable to apply zoom factor smoothing operations to only certain portions of a captured video image sequence (e.g., only when there is a zoom operation requested from a user, only to certain image capture devices or transitions between certain image capture devices, or only when the amount of change in total zoom factor requested by a user exceeds a predetermined threshold amount and/or in less than or equal to a predetermined threshold period of time, etc.).

Exemplary Smooth Zoom-Aware Video Image Stabilization (VIS) Operations

Figure 6:
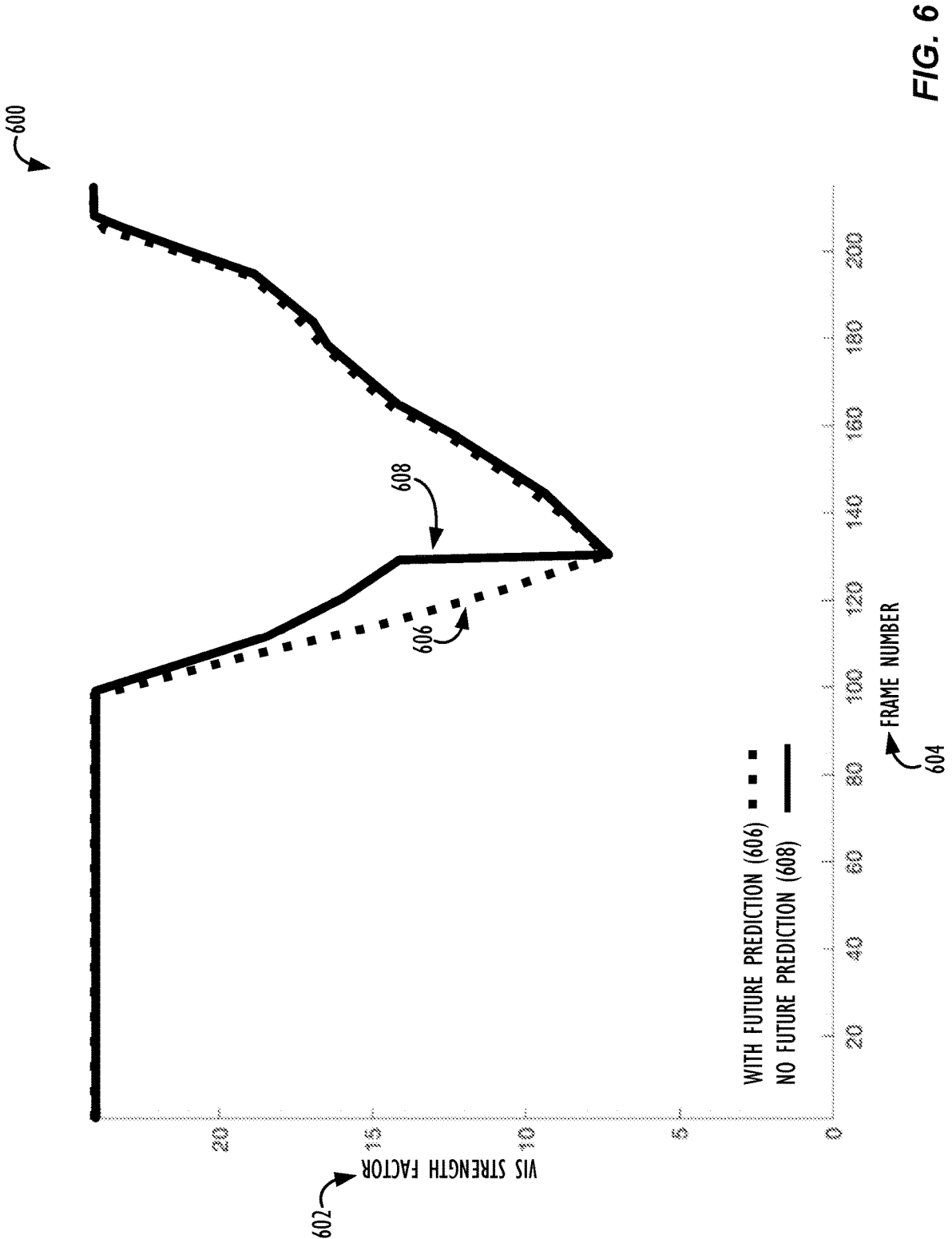
FIG. 6 is a graph illustrating exemplary smooth zoom-aware video image stabilization (VIS) operations, according to one or more embodiments.

Referring now to FIG. 6, a graph 600 illustrating exemplary smooth zoom-aware video image stabilization (VIS) operations is shown, according to one or more embodiments. The vertical axis 602 of graph 600 represents a VIS strength factor that is being applied to a given captured image frame (with higher stabilization strength factor values meaning that more image stabilization, and thus possibly more of the image capture device's available overscan is being used by the VIS operations, and lower stabilization strength factor values meaning that less image stabilization, and thus less of the image capture device's available overscan is being used by the VIS operations), and the horizontal axis 604 of graph 600 represents the frame number of exemplary video image frames captured over time, moving from left to right across the horizontal axis.

As illustrated in graph 600, a VIS strength factor trajectory for the exemplary image capture device without the benefit of knowledge of the amount of digital zooming (i.e., digital zoom to be applied after zoom smoothing) that will be needed for future captured image frames is shown by solid line 608, while a corresponding VIS strength factor trajectory for the exemplary image capture device with the benefit of knowledge of the amount of digital zooming to be applied to future captured image frames is shown by dashed line 606. As may now be appreciated, without knowledge of the amount of the overscan region that may be utilized in upcoming frames for the zoom smoothing operations, VIS strength factor trajectory 608 may experience abrupt or rapid changes in stabilization strength, e.g., so that the stabilization strength factor value can be lowered enough to compensate for the amount of the overscan needed for the upcoming zoom smoothing operations (e.g., at around frame 130 in the example of graph 600, the stabilization strength factor has to drop very rapidly to a value of approximately 7). On the other hand, with knowledge of the amount of the overscan region that will be utilized in upcoming frames for the zoom smoothing operations, VIS strength factor trajectory 606 is able to more smoothly and gradually adjust the stabilization strength factor value down to the necessary value of approximately 7 by frame 130, which can result in a less abrupt change to the apparent stability of the images in the video image stream. In other words, the VIS strength factor values may be determined based, at least in part, on the smoothed digital zoom values of a set of one or more future image frames. The number of image frames that the VIS strength factor trajectory 606 may have knowledge of may be another tunable parameter (e.g., a 5 frame lookahead, a 10 frame lookahead, etc.).

Exemplary Smooth Zooming Operations

Referring now to FIG. 7A, a flow chart is shown, illustrating a method 700 of performing smooth zooming operations in a multi-image capture device electronic device, according to one or more embodiments. The method 700 may begin at Step 702 by receiving a first request from a user to begin capturing a first video with an electronic device. In some embodiments, the electronic device may comprise at least: a first image capture device having a first optical zoom, a first field view of view (FOV), and a first range of digital zoom values; and a second image capture device having a second optical zoom, a second FOV, and a second range of digital zoom values.

Next, at Step 704, the method 700 may begin to obtain a first video image stream from the first image capture device for use in producing the first video. The first video image stream is captured with a first total zoom factor, wherein the first total zoom factor is determined based on the first optical zoom and a current first digital zoom value from within the first range of digital zoom values. It is to be understood that the first total zoom factor of the first image capture device may be dynamic and change over time, e.g., as additional video images are captured and/or in response to "zoom in" or "zoom out" requests received from a first user, e.g., via a user interface of the electronic device. For example, if the first image capture device has an optical zoom factor of 2.0× and a current digital zoom value of 3.0×, then the current first total zoom factor may be said to be 6.0× (i.e., 2.0*3.0). However, if later during the capture of the first video image stream, the first image capture device still has an optical zoom factor of 2.0× but it has a then-current digital zoom value of 6.0×, the then-current first total zoom factor would be 12.0× (i.e., 2.0*6.0). In this way, each image capture device may have a range of possible total zoom factors that it is able to capture images with.

At Step 706, the method 700 may obtain a second request from the user to zoom in the first video image stream to a first target total zoom factor. Next, at Step 708, and in response to receiving the second request, the method 700 may begin to increase the first digital zoom value of the first image capture device (Step 710). Then, before reaching a maximum value of the first range of digital zoom values, the electronic device may switch the active image capture device, e.g., to begin to obtain a second video image stream from the second image capture device for use in producing the first video (Step 712). The second video image stream is captured with a second total zoom factor, wherein the second total zoom factor is determined based on the second optical zoom and a current second digital zoom value from within the second range of digital zoom values. In some embodiments, the first total zoom factor may be equal to the second total zoom factor when the electronic device switches to obtain the second video image stream from the second image capture device (e.g., to help avoid any jarring jumps in zoom level during the zoom operation). Next, at Step 714, the method 700 may increase the second digital zoom value until the second total zoom factor reaches the first target total zoom factor.

Finally, at Step 716, the method 700 may produce the first video based, at least in part, on a combination of the first video image stream and the second video image stream. For example, the produced first video may comprise of the images of the first video image stream as captured by the first image capture device (and subject to any additional zoom smoothing, VIS, or other post-processing operations that may be applied to the first video image stream images), followed by the images of the second video image stream as captured by the second image capture device (again, subject to any additional zoom smoothing, VIS, or other post-processing operations that may be applied to the second video image stream images).

Referring now to FIG. 7B, a flow chart is shown, illustrating another method 750 of performing smooth zooming operations in a multi-image capture device electronic device, according to one or more embodiments. The method 750 may begin at Step 752, e.g., following the performance of Step 716 of FIG. 7A (e.g., a smooth "zoom in" operation that transitions from a first image capture device to a second image capture device) by obtaining a third request from the user to zoom out the second video image stream to a second target total zoom factor. Next, at Step 754, and in response to receiving the third request, the method 750 may optionally begin to decrease the second digital zoom value of the second image capture device (Step 756), e.g., if it is not desired or not possible to immediately switch back to capturing the video images with the first image capture device. Then, the method 750 may proceed to switch the active image capture device to obtain a third video image stream from the first image capture device for use in producing the first video, wherein the third video image stream is captured with the first total zoom factor, and wherein the first total zoom factor is equal to the second total zoom factor when the device switches to obtain the third video image stream from the first image capture device (Step 758). Next, at Step 760, the method 750 may decrease the first digital zoom value until the first total zoom factor reaches the second target total zoom factor. As described above, according to some embodiments, the rate (and/or the amount) at which the first image capture device zooms out may be based on: predetermined zoom settings established in the smooth zoom framework; an amount of movement or positional change in the image capture device during the capture of the third video image stream (which may, e.g., determine how much of an available overscan region is reserved for VIS operations rather than zoom smoothing operations); other metadata obtained from images captured in the third video image stream; or any combination of such factors.

Finally, at Step 762, the method 750 may produce the first video further based, at least in part, on a combination of the first video image stream, the second video image stream, and the third video image stream. For example, the produced first video may comprise of the images of the first video image stream as captured by the first image capture device (and subject to any additional zoom smoothing, VIS, or other post-processing operations that may be applied to the first video image stream images), followed by the images of the second video image stream as captured by the second image capture device, and then follow by the images of the third video image stream as captured by the first image capture device during the zoom out operation (again, subject to any additional zoom smoothing, VIS, or other post-processing operations that may be applied to the third video image stream images).

Referring now to FIG. 7C, a flow chart is shown, illustrating a method 770 of performing smooth zooming operations using a single image capture device of an electronic device, according to one or more embodiments. The method

770 may begin at Step 772 by receiving a first request from a user to begin capturing a first video with an electronic device. In some embodiments, the electronic device may comprise at least: a first image capture device having a first optical zoom, a first field view of view (FOV), and a first range of digital zoom values.

Next, at Step 774, the method 770 may begin to obtain a first video image stream from the first image capture device for use in producing the first video. The first video image stream is captured with a first total zoom factor, wherein the first total zoom factor is determined based on the first optical zoom and a current first digital zoom value from within the first range of digital zoom values. At Step 776, the method 770 may obtain a second request from the user to perform a zooming operation on the first video image stream to reach a first target total zoom factor. Next, at Step 778, and in response to receiving the second request, the method 770 may compute a first trajectory for the first total zoom factor, wherein the computed first trajectory adjusts the first total zoom factor of the first image capture device over time towards the first target total zoom factor (Step 780). Then, the electronic device may perform one or more first smoothing operations on the first computed trajectory for the first total zoom factor to produce a first smoothed trajectory for the first total zoom factor (Step 782), e.g., such as the smoothed total zoom factor trajectory 508, discussed above with reference to FIG. 5. The electronic device may then adjust the first total zoom value of the first image capture device over time in accordance with the first smoothed trajectory for the first total zoom factor (Step 784).

Finally, at Step 786, the method 770 may produce the first video based, at least in part, on the images of the first video image stream, as adjusted in accordance with the first smoothed trajectory for the first total zoom factor. For example, the produced first video may comprise of the images of the first video image stream as captured by the first image capture device (and subject to any additional zoom smoothing, VIS, or other post-processing operations that may be applied to the first video image stream images).

Exemplary Electronic Computing Devices

Figure 8:
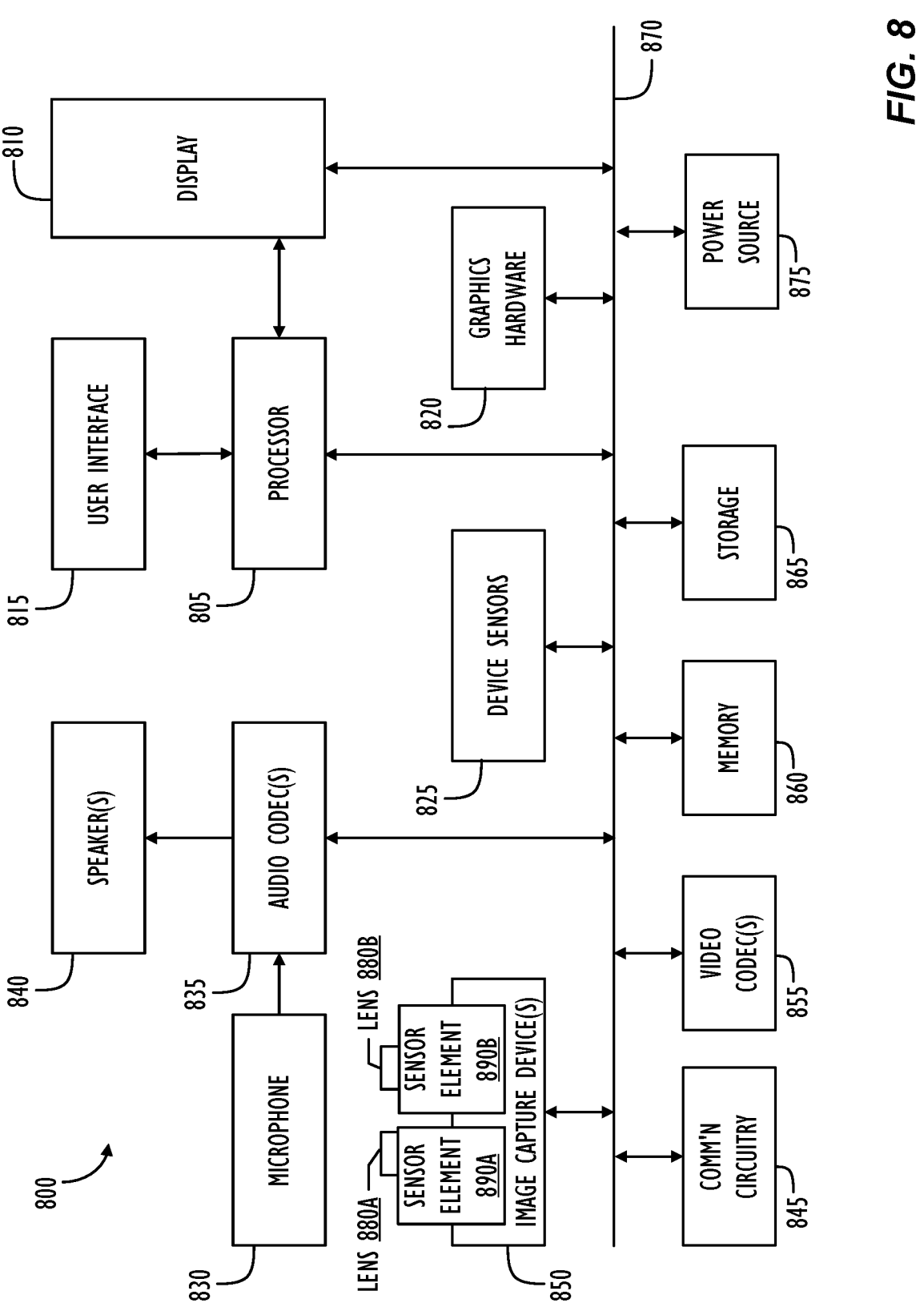
FIG. 8 is a block diagram illustrating a programmable electronic computing device, in which one or more of the techniques disclosed herein may be implemented.

Referring now to FIG. 8, a simplified functional block diagram of illustrative programmable electronic computing device 800 is shown according to one embodiment. Electronic device 800 could be, for example, a mobile telephone, personal media device, portable camera, or a tablet, notebook or desktop computer system. As shown, electronic device 800 may include processor 805, display 810, user interface 815, graphics hardware 820, device sensors 825 (e.g., proximity sensor/ambient light sensor, accelerometer, inertial measurement unit, and/or gyroscope), microphone 830, audio codec(s) 835, speaker(s) 840, communications circuitry 845, image capture device(s) 850, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 855, memory 860, storage 865, and communications bus 880.

Processor 805 may execute instructions necessary to carry out or control the operation of many functions performed by electronic device 800 (e.g., such as the processing of images in accordance with the various embodiments described herein). Processor 805 may, for instance, drive display 810 and receive user input from user interface 815. User interface 815 can take a variety of forms, such as a button, keypad, dial, a click wheel, keyboard, display screen and/or a touch screen. User interface 815 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 810 may display a video stream as it is captured while processor 805 and/or graphics hardware 820 and/or image capture circuitry contemporaneously generate and store the video stream in memory 860 and/or storage 865. Processor 805 may be a system-on-chip (SOC) such as those found in mobile devices and include one or more dedicated graphics processing units (GPUs). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 perform computational tasks. In one embodiment, graphics hardware 820 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device(s) 850 may comprise one or more camera units configured to capture images, e.g., images which may be processed to help further calibrate said image capture device in field use, e.g., in accordance with this disclosure. Image capture device(s) 850 may include two (or more) lens assemblies 880A and 880B, where each lens assembly may have a separate focal length. For example, lens assembly 880A may have a shorter focal length relative to the focal length of lens assembly 880B. Each lens assembly may have a separate associated sensor element, e.g., sensor elements 890A/890B. Alternatively, two or more lens assemblies may share a common sensor element. Image capture device(s) 850 may capture still and/or video images. Output from image capture device(s) 850 may be processed, at least in part, by video codec(s) 855 and/or processor 805 and/or graphics hardware 820, and/or a dedicated image processing unit or image signal processor incorporated within image capture device(s) 850. Images so captured may be stored in memory 860 and/or storage 865.

Memory 860 may include one or more different types of media used by processor 805, graphics hardware 820, and image capture device(s) 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805, such computer program code may implement one or more of the methods or processes described herein. Power source 875 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 800.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:

a memory;

a first image capture device having a first optical zoom, a first field view of view (FOV), and a first range of digital zoom values;

a second image capture device having a second optical zoom, a second FOV, and a second range of digital zoom values; and one or more processors operatively coupled to the memory, wherein the one or more processors are configured to execute instructions causing the one or more processors to:

receive a first request from a user to begin capturing a first video;

obtain a first video image stream from the first image capture device for use in producing the first video, wherein the first video image stream is captured with a first total zoom factor, wherein the first total zoom factor is determined based on the first optical zoom and a current first digital zoom value from within the first range of digital zoom values;

obtain a second request from the user to zoom in the first video image stream to a first target total zoom factor;

in response to the second request:

increase the first digital zoom value of the first image capture device, wherein the instructions causing the one or more processors to increase the first digital zoom value of the first image capture device further comprise instructions causing the one or more processors to:

perform one or more first smoothing operations on a first computed trajectory for the first total zoom factor to produce a first smoothed trajectory for the first total zoom factor; and increase the first digital zoom value of the first image capture device over time in accordance with the first smoothed trajectory for the first total zoom factor;

before reaching a maximum value of the first range of digital zoom values, switch to obtain a second video image stream from the second image capture device for use in producing the first video, wherein the second video image stream is captured with a second total zoom factor, wherein the second total zoom factor is determined based on the second optical zoom and a current second digital zoom value from within the second range of digital zoom values, and wherein the first total zoom factor is equal to the second total zoom factor when the one or more processors switch to obtain the second video image stream from the second image capture device; and increase the second digital zoom value until the second total zoom factor reaches the first target total zoom factor; and produce the first video based, at least in part, on a combination of the first video image stream and the second video image stream.

2. The device of claim 1, wherein the second FOV is narrower than the first FOV, and wherein the second optical zoom is greater than the first optical zoom.

3. The device of claim 1, wherein the first image capture device and the second image capture device are capable of producing partially-overlapping ranges of total zoom factors for captured video image streams.

4. The device of claim 1, wherein the first target total zoom factor is outside a range of total zoom factors obtainable by the first image capture device.

5. The device of claim 1, wherein the one or more processors are configured to execute instructions causing the one or more processors to:

obtain a third request from the user to zoom out the second video image stream to a second target total zoom factor;

in response to the third request:

switch to obtain a third video image stream from the first image capture device for use in producing the first video, wherein the third video image stream is captured with the first total zoom factor, and wherein the first total zoom factor is equal to the second total zoom factor when the one or more processors switch to obtain the third video image stream from the first image capture device; and decrease the second digital zoom value until the second total zoom factor reaches the second target total zoom factor; and produce the first video further based, at least in part, on a combination of the first video image stream, the second video image stream, and the third video image stream.

6. The device of claim 5, wherein the instructions causing the one or more processors to decrease the second digital zoom value further comprise instructions causing the one or more processors to:

perform one or more third smoothing operations on a third computed trajectory for the second total zoom factor to produce a third smoothed trajectory for the second total zoom factor; and decrease the second digital zoom value of the second image capture device over time in accordance with the third smoothed trajectory for the second total zoom factor.

7. The device of claim 6, wherein the instructions causing the one or more processors to decrease the first digital zoom value until the first total zoom factor reaches the second target total zoom factor further comprise instructions causing the one or more processors to:

perform one or more fourth smoothing operations on a fourth computed trajectory for the first total zoom factor to produce a fourth smoothed trajectory for the first total zoom factor; and decrease the first digital zoom value of the first image capture device over time in accordance with the fourth smoothed trajectory for the first total zoom factor.

8. The device of claim 5, wherein a first rate at which the second digital zoom value of the second image capture device is decreased is determined based, at least in part, on an overscan allocation parameter, wherein the overscan allocation parameter allocates a first portion of an overscan region of the second FOV to decreasing the second digital zoom value of the second image capture device, and wherein the overscan allocation parameter allocates a second portion of the overscan region of the second FOV to video image stabilization (VIS) operations.

9. The device of claim 8, wherein a value of the overscan allocation parameter is determined based, at least in part, on one or more of the following:

a predetermined overscan allocation value;

positional information obtained from one or more positional sensors of the device during the capture of the second video image stream; or metadata obtained from images captured in the second video image stream.

10. The device of claim 8, wherein strength values for the VIS operations are determined based, at least in part, on the first rate at which the second digital zoom value of the second image capture device is decreased.

11. The device of claim 1, wherein the instructions causing the one or more processors to increase the second digital zoom value until the second total zoom factor reaches the first target total zoom factor further comprise instructions causing the one or more processors to:

perform one or more second smoothing operations on a second computed trajectory for the second total zoom factor to produce a second smoothed trajectory for the second total zoom factor; and increase the second digital zoom value of the second image capture device over time in accordance with the second smoothed trajectory for the second total zoom factor.

12. A non-transitory program storage device comprising instructions stored thereon to cause one or more processors to:

receive a first request from a user to begin capturing a first video with a device, the device comprising:

a first image capture device having a first optical zoom, a first field view of view (FOV), and a first range of digital zoom values; and a second image capture device having a second optical zoom, a second FOV, and a second range of digital zoom values;

obtain a first video image stream from the first image capture device for use in producing the first video, wherein the first video image stream is captured with a first total zoom factor, wherein the first total zoom factor is determined based on the first optical zoom and a current first digital zoom value from within the first range of digital zoom values;

obtain a second request from the user to zoom in the first video image stream to a first target total zoom factor;

in response to the second request:

increase the first digital zoom value of the first image capture device, wherein the instructions causing the one or more processors to increase the first digital zoom value of the first image capture device further comprise instructions causing the one or more processors to:

perform one or more first smoothing operations on a first computed trajectory for the first total zoom factor to produce a first smoothed trajectory for the first total zoom factor; and increase the first digital zoom value of the first image capture device over time in accordance with the first smoothed trajectory for the first total zoom factor;

before reaching a maximum value of the first range of digital zoom values, switch to obtain a second video image stream from the second image capture device for use in producing the first video, wherein the second video image stream is captured with a second total zoom factor, wherein the second total zoom factor is determined based on the second optical zoom and a current second digital zoom value from within the second range of digital zoom values, and wherein the first total zoom factor is equal to the second total zoom factor when the one or more processors switch to obtain the second video image stream from the second image capture device; and increase the second digital zoom value until the second total zoom factor reaches the first target total zoom factor; and produce the first video based, at least in part, on a combination of the first video image stream and the second video image stream.

13. The non-transitory program storage device of claim 12, further comprising instructions stored thereon to cause the one or more processors to:

obtain a third request from the user to zoom out the second video image stream to a second target total zoom factor;

in response to the third request:

switch to obtain a third video image stream from the first image capture device for use in producing the first video, wherein the third video image stream is captured with the first total zoom factor, and wherein the first total zoom factor is equal to the second total zoom factor when the one or more processors switch to obtain the third video image stream from the first image capture device; and decrease the second digital zoom value until the first-second total zoom factor reaches the second target total zoom factor; and produce the first video further based, at least in part, on a combination of the first video image stream, the second video image stream, and the third video image stream.

14. The non-transitory program storage device of claim 13, wherein the instructions causing the one or more processors to decrease the second digital zoom value further comprise instructions causing the one or more processors to:

perform one or more smoothing operations on a computed trajectory for the second total zoom factor to produce a smoothed trajectory for the second total zoom factor; and decrease the second digital zoom value of the second image capture device over time in accordance with the smoothed trajectory for the second total zoom factor.

15. An image processing method, comprising:

receiving a first request from a user to begin capturing a first video with a device, the device comprising:

a first image capture device having a first optical zoom, a first field view of view (FOV), and a first range of digital zoom values; and a second image capture device having a second optical zoom, a second FOV, and a second range of digital zoom values;

obtaining a first video image stream from the first image capture device for use in producing the first video, wherein the first video image stream is captured with a first total zoom factor, wherein the first total zoom factor is determined based on the first optical zoom and a current first digital zoom value from within the first range of digital zoom values;

obtaining a second request from the user to zoom in the first video image stream to a first target total zoom factor;

in response to the second request:

increasing the first digital zoom value of the first image capture device, wherein increasing the first digital zoom value of the first image capture device further comprises:

performing one or more first smoothing operations on a first computed trajectory for the first total zoom factor to produce a first smoothed trajectory for the first total zoom factor; and increasing the first digital zoom value of the first image capture device over time in accordance with the first smoothed trajectory for the first total zoom factor;

before reaching a maximum value of the first range of digital zoom values, switch to obtaining a second video image stream from the second image capture device for use in producing the first video, wherein the second video image stream is captured with a second total zoom factor, wherein the second total zoom factor is determined based on the second optical zoom and a current second digital zoom value from within the second range of digital zoom values, and wherein the first total zoom factor is equal to the second total zoom factor when switching to obtain the second video image stream from the second image capture device; and increasing the second digital zoom value until the second total zoom factor reaches the first target total zoom factor; and producing the first video based, at least in part, on a combination of the first video image stream and the second video image stream.

16. The method of claim 15, further comprising:

obtaining a third request from the user to zoom out the second video image stream to a second target total zoom factor;

in response to the third request:

switching to obtaining a third video image stream from the first image capture device for use in producing the first video, wherein the third video image stream is captured with the first total zoom factor, and wherein the first total zoom factor is equal to the second total zoom factor when switching to obtain the third video image stream from the first image capture device; and decreasing the second digital zoom value until the second total zoom factor reaches the second target total zoom factor; and producing the first video further based, at least in part, on a combination of the first video image stream, the second video image stream, and the third video image stream.

17. The method of claim 16, wherein decreasing the second digital zoom value further comprises:

performing one or more smoothing operations on a computed trajectory for the second total zoom factor to produce a smoothed trajectory for the second total zoom factor; and decreasing the second digital zoom value of the second image capture device over time in accordance with the smoothed trajectory for the second total zoom factor.

18. The method of claim 16, wherein a first rate at which the second digital zoom value of the second image capture device is decreased is determined based, at least in part, on an overscan allocation parameter, wherein the overscan allocation parameter allocates a first portion of an overscan region of the second FOV to decreasing the second digital zoom value of the second image capture device, and wherein the overscan allocation parameter allocates a second portion of the overscan region of the second FOV to video image stabilization (VIS) operations.

19. The method of claim 18, wherein strength values for the VIS operations are determined based, at least in part, on the first rate at which the second digital zoom value of the second image capture device is decreased.

20. A device, comprising:

a memory;

a first image capture device having a first optical zoom, a first field view of view (FOV), and a first range of digital zoom values; and one or more processors operatively coupled to the memory, wherein the one or more processors are configured to execute instructions causing the one or more processors to:

receive a first request from a user to begin capturing a first video;

obtain a first video image stream from the first image capture device for use in producing the first video, wherein the first video image stream is captured with a first total zoom factor, wherein the first total zoom factor is determined based on the first optical zoom and a current first digital zoom value from within the first range of digital zoom values;

obtain a second request from the user to perform a zooming operation on the first video image stream to reach a first target total zoom factor;

in response to the second request:

compute a first trajectory for the first total zoom factor, wherein the computed first trajectory adjusts the first total zoom factor of the first image capture device over time towards the first target total zoom factor;

perform one or more first smoothing operations on the first computed trajectory for the first total zoom factor to produce a first smoothed trajectory for the first total zoom factor; and adjust the first total zoom value of the first image capture device over time in accordance with the first smoothed trajectory for the first total zoom factor; and produce the first video based, at least in part, on the images of the first video image stream, as adjusted in accordance with the first smoothed trajectory for the first total zoom factor.

21. The device of claim 20, wherein a first rate at which the first total zoom factor of the first image capture device is adjusted is determined based, at least in part, on an overscan allocation parameter, wherein the overscan allocation parameter allocates a first portion of an overscan region of the first FOV to video image stabilization (VIS) operations.

22. The device of claim 21, wherein a value of the overscan allocation parameter is determined based, at least in part, on one or more of the following:

a predetermined overscan allocation value;

positional information obtained from one or more positional sensors of the device during the capture of the first video image stream; or metadata obtained from images captured in the first video image stream.

23. The device of claim 21, wherein strength values for the VIS operations are determined based, at least in part, on the first rate at which the first total zoom value of the first image capture device is decreased.

24. The device of claim 21, wherein the overscan allocation parameter allocates a second portion of the overscan region of the first FOV to adjusting the first total zoom value of the first image capture device.

25. The device of claim 20, wherein the zooming operation comprises at least one of: a zoom in operation; or a zoom out operation.

* * * * *